Patented Apr. 27, 1937

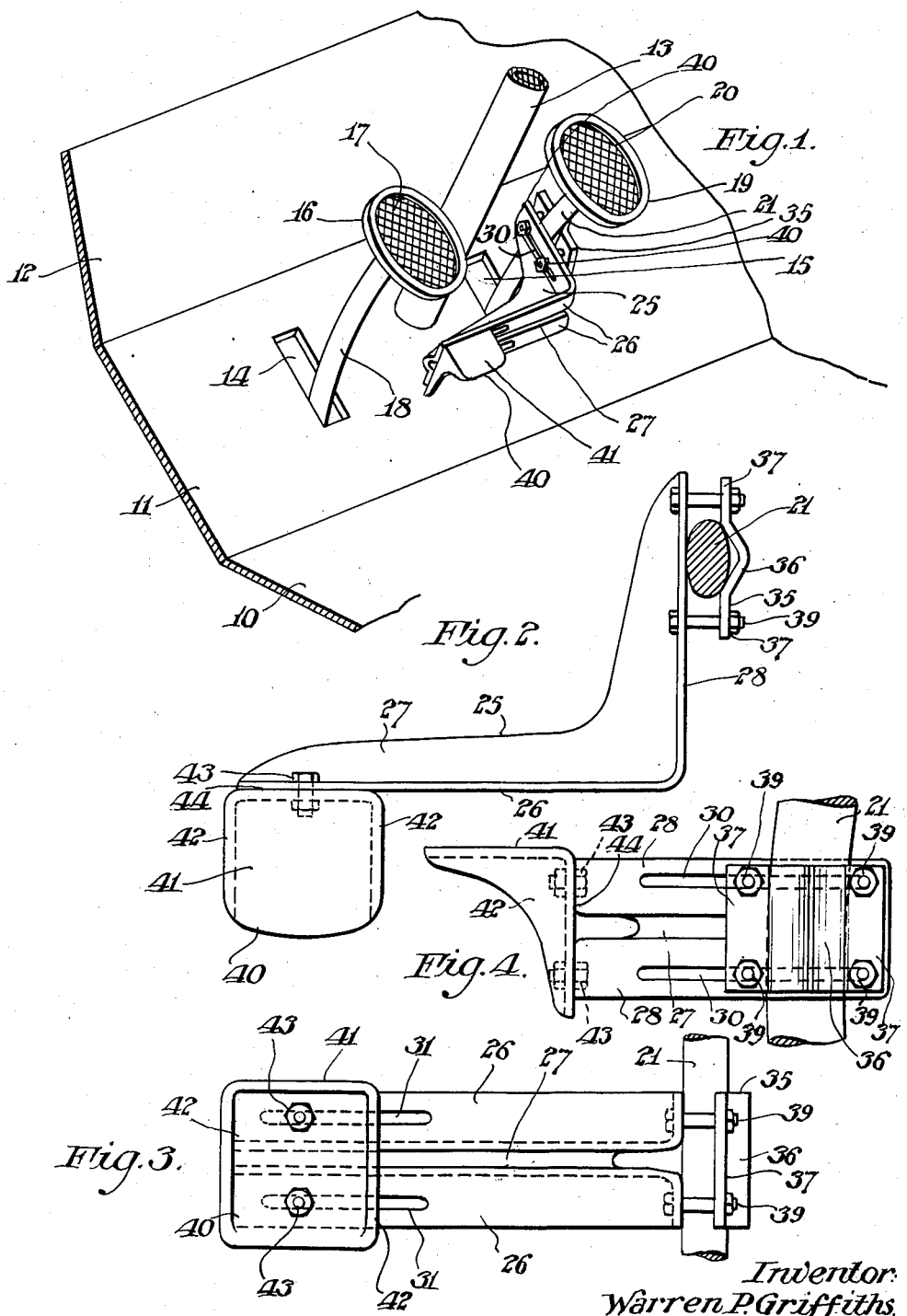

2,078,324

UNITED STATES PATENT OFFICE 2,078,324

PEDAL ATTACHMENT

Warren P. Griffiths, Trenton, N. J.

Application April 18, 1936, Serial No. 75,063

10 Claims. (Cl. 192—13)

My invention relates to pedal attachments, and more particularly to an attachment for use in connection with the brake pedal of an automobile to facilitate the operation of the car.

When an automobile has been stopped on a hill the driver frequently has difficulty in starting the same without stalling the engine. This is due to the fact that actuation of the foot accelerator is necessary at the same time that the feet are being used to control the brakes and the clutch. Some drivers make use of the hand brake in order to leave the feet free to operate the clutch pedal and the accelerator. The hand brake is, however, located at a position which renders this rather difficult.

The present invention has for its object the provision of a suitable attachment for the brake pedal of an automobile by the use of which one foot of the operator may be utilized to release the brakes and engage the clutch, leaving the other foot free to operate the foot accelerator. This materially increases the ease of operation of the car.

It is also an object of the present invention to provide a brake pedal attachment which will be simple in construction, strong and sturdy, and which may be readily adjusted to the desired position for effecting operation of the brake pedal upon actuation by the operator of the clutch pedal.

It is also an object of the invention to provide a brake pedal attachment which may be inexpensively constructed of stamped sheet metal.

It is also an object of the invention to provide a brake pedal attachment which may be applied to practically all types of cars now in use and without any interference with the steering column, the starter switch or the foot accelerator.

Other objects of the invention will appear from the annexed specification and claims.

The nature and characteristic features of the present invention will be more readily understood from the following description, taken in connection with the accompanying drawing forming part hereof, in which Fig. 1 is a perspective view showing a preferred embodiment of the pedal attachment of the present invention and illustrating the relationship thereof to the brake pedal and the clutch pedal, as well as to the steering column;

Fig. 2 is a top plan view of the brake pedal attachment;

Fig. 3 is a front elevational view; and

Fig. 4 is a side elevational view thereof.

It will, of course, be understood that the description and drawing herein contained are illustrative merely and that various modifications and changes may be made in the structure disclosed without departing from the spirit of the invention.

Referring more particularly to the drawing there is therein illustrated a preferred form of the present invention together with the portions of the automobile with which it is associated.

In most automobiles, as constructed at the present time, a horizontal floor board 10 is provided, and at the forward end thereof an inclined floor board 11 is mounted on a portion of the frame of the vehicle. From the forward end of the floor board 11 a board 12 extends vertically upward. The steering column, as at 13, and brake and clutch pedals usually extend through the inclined floor board 11, and apertures or slots are provided, as at 14 and 15, for the pedal levers. The clutch pedal is illustrated at 16 and comprises an enlarged foot bearing portion 17 with a frictional face and a pedal lever 18, which lever extends through the slot 14. A brake pedal 19 is also provided and includes an enlarged foot bearing portion 20 with a frictional face, and a brake pedal lever 21 which extends through the slot 15 in the floor board 11.

The attachment of the present invention includes a body portion 25, preferably stamped from sheet metal. The body portion 25 has flat side faces 26 connected by a U-shaped rib 27 and flat end faces 28 disposed at right angles to the flat side faces 26. A continuation of the rib 27 connects the flat end faces 28 so that the body portion 25 is rigid and will not be deflected or bent, and the flat faces 26 and 28 will be held securely in their respective positions.

The flat end faces 28 are provided with slots 30, and the flat side faces 26 have slots 31 therein for purposes hereinafter explained.

Clamping structure is provided for holding the body portion 25 securely clamped with respect to the brake pedal lever 21 and includes a clamping member 35 having a V-shaped central portion 36 for engagement with the brake pedal lever 21. The provision of the flat surfaces 28 and the V-shaped surface in the portion 36, for engagement with the brake pedal lever 21, permits of proper angular adjustment of the body portion 25 with respect to the brake pedal lever 21. The clamping member 35 has flat edge flanges 37 with holes therein for alinement with the slots 30 in the flat end faces 28, in accordance with the position of forward or rearward adjustment desired. Bolts 39 pass through the holes in the flanges 37 and through the slots 30 for drawing the clamping member 35 and body portion 25 into tight engagement with the brake pedal lever 21.

A foot contact member 40 is mounted at the end of the body portion 25 remote from the point of attachment to the brake pedal lever 21. The foot contact member 40 includes a contact surface, as at 41, for engagement by the heel or other portion of the foot of the operator, as hereinafter pointed out. This foot contact member 40 is provided with a flat portion 44 for engagement with the flat side faces 26 and has side ribs 42 to render the same rigid. The flat portion 44 has holes therethrough for alinement with the slots 31, and bolts 43 which pass through these holes and through the slots 31 hold the foot contact member 40 firmly with respect to the body portion 25. The mounting of the bolts 43 in the slots 31 permits of adjustment of the foot contact member 40 along the body portion 25 to the desired position.

It has been found in practice that car operators differ in the location at which they prefer to have the foot contact member 40 mounted with respect to the clutch pedal bearing portion 17. The same foot which is used to operate the clutch pedal may be used to operate the brake pedal by means of the attachment of the present invention but the manner in which this is done varies with individual operators.

The position of the foot contact member 40 generally preferred is off the lower right hand portion of the clutch pedal bearing portion 17. In this position, the clutch pedal may be operated without regard to the brakes by using the foot in the customary manner. In order to use the pedal attachment and control the brakes with the clutch, the foot may then be twisted slightly so that the heel is somewhat to the right and sufficient to bear on the foot contact member 40. The operator may then actuate with one foot the brake pedal 19 and the clutch pedal 16.

The provision made for adjustment of the foot contact member 40 along the body portion 25, by reason of the slots 31 in the side faces 26, permits of spacing the foot contact member 40 as desired, from the clutch pedal bearing portion 17. The angular location, height with respect to the clutch pedal bearing portion 17, and front to back adjustment of the body portion 25 are effected through setting of the clamping member 35 in its desired position with respect to the slots 30 in the end faces 28 and then tightening the bolts 39.

I claim:

1. An attachment for pedals comprising a body member, said body member having end face portions and side face portions and a rib connecting said face portions, clamping means mounted on said end face portions and secured thereto for gripping a pedal lever between said end face portions and said clamping means, a foot contact member adapted to be disposed adjacent another pedal for actuation therewith and means for mounting said contact member for adjustment along said body member.

2. In combination with a plurality of pedals, a pedal attachment comprising a body member, said body member having end face portions and side face portions and a rib connecting said face portions, means for clamping a pedal lever in contact with said end face portions, a foot contact member on said body member adapted to be disposed adjacent another pedal for actuation therewith, and means for mounting said contact member for adjustment along said body member.

3. In combination with a plurality of pedals, a pedal attachment comprising a body member, said body member having end face portions, side face portions and a U-shaped portion connecting said face portions, means for adjustably clamping a pedal lever in contact with said end face portions, a foot contact member on said body member adapted to be disposed adjacent another pedal for actuation therewith, and means for mounting said contact member for adjustment along said body member.

4. A pedal attachment comprising a body member, said body member having perpendicularly disposed side and end portions, means for securing said end portion to a pedal, a foot contact member disposed adjacent a second pedal for actuation therewith, and means for mounting said foot contact member on said side portion for adjustment along said side portion.

5. A pedal attachment comprising a body member, said body member having angularly disposed side and end portions, means for securing said end portion to a pedal for adjustment with respect thereto, a foot contact member having a face disposed adjacent a second pedal for actuation therewith, and means for mounting said foot contact member on said side portion for longitudinal adjustment with respect to said body member.

6. In combination with the clutch and brake pedals of an automobile, a brake pedal operating attachment including a body member having perpendicularly disposed portions, a brake pedal attaching means, a foot contact member on one of said portions and disposed below the face of the clutch pedal, and means for adjustably mounting said foot contact member on the other of said portions, said means including a slot formed in said other portion and a bolt passing through said other portion and through said slot.

7. In combination with the clutch and brake pedals of an automobile, a brake pedal operating attachment, said brake pedal attachment including a body member having perpendicularly disposed portions, a brake pedal attaching means mounted on one of said portions, a foot contact member on the other of said portions and disposed below the face of the clutch pedal, and means for mounting said foot contact member for adjustment along said other body portion, said means including a slot formed in said other body portion and a bolt passing through said foot contact member and through said slot.

8. In combination with the clutch and brake pedals of an automobile, a brake pedal operating attachment, said brake pedal attachment including a body member having perpendicularly disposed portions, a brake pedal attaching means, a foot contact member having a face portion disposed below the face of the clutch pedal, and means for adjustably mounting said foot contact member on one of said portions of said body member, the means for mounting said foot contact member including a slot formed in one of said members and a bolt passing through said other member and through said slot.

9. In combination with the clutch and brake pedals of an automobile, a brake pedal operating attachment, said brake pedal attachment including a body member having an end face portion and a side face portion, said face portion being perpendicularly disposed with respect to the end portion, means for attaching the brake pedal in contact with said end face portion, a foot contact member mounted on said side face portion and having a foot contact face portion disposed below the face of the clutch pedal, and means for adjustably mounting said foot contact member including a slot in said side face portion and a bolt passing through said foot contact member and through said slot.

10. In combination with the clutch and brake pedals of an automobile, a brake pedal operating attachment, said brake pedal attachment including a body member having an end face portion and a side face portion, said side face portion being perpendicularly disposed with respect to said end face portion, means for attaching the brake pedal to said end face portion, said means including a slot in said end face portion, a foot contact member mounted on said side face portion and having a foot contact face portion disposed below the face of the clutch pedal, the means for mounting said foot contact member including a slot formed in said side face portion and a bolt passing through said foot contact member and said slot.

WARREN P. GRIFFITHS.